United States Patent
Suto et al.

(10) Patent No.: US 12,512,706 B2
(45) Date of Patent: Dec. 30, 2025

(54) STATOR FOR DYNAMO-ELECTRIC MACHINE, DYNAMO-ELECTRIC MACHINE, ELECTRIC DRIVE SYSTEM, AND ELECTRIFIED WHEEL

(71) Applicant: Hitachi, Ltd., Tokyo (JP)

(72) Inventors: Tetsuya Suto, Tokyo (JP); Akeshi Takahashi, Tokyo (JP); Makoto Ito, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 307 days.

(21) Appl. No.: 18/281,729

(22) PCT Filed: Jan. 14, 2022

(86) PCT No.: PCT/JP2022/001070
§ 371 (c)(1),
(2) Date: Sep. 12, 2023

(87) PCT Pub. No.: WO2022/209140
PCT Pub. Date: Oct. 6, 2022

(65) Prior Publication Data
US 2024/0162761 A1    May 16, 2024

(30) Foreign Application Priority Data
Mar. 29, 2021  (JP) ................. 2021-054487

(51) Int. Cl.
*H02K 1/16* (2006.01)
*B60K 7/00* (2006.01)
*H02K 3/28* (2006.01)

(52) U.S. Cl.
CPC ............. *H02K 1/16* (2013.01); *B60K 7/0007* (2013.01); *H02K 3/28* (2013.01); *B60K 2007/0061* (2013.01); *H02K 2213/03* (2013.01)

(58) Field of Classification Search
CPC .......... B60K 7/0007; B60K 2007/0061; H02K 1/16; H02K 3/28; H02K 2213/03
(Continued)

(56) References Cited

U.S. PATENT DOCUMENTS 6,218,758 B1 * 4/2001 Miura ............... H02K 3/18
                                                310/216.071
6,373,164 B1 * 4/2002 Nishimura ........... H02K 3/12
                                                310/198
(Continued)

FOREIGN PATENT DOCUMENTS

EP    2 833 520 A1   2/2015
JP    2004-274965 A  9/2004
(Continued)

OTHER PUBLICATIONS

Extended European Search Report issued in European Application No. 22779373.4 dated Jan. 8, 2025 (10 pages).
(Continued)

*Primary Examiner* — Rashad H Johnson
(74) *Attorney, Agent, or Firm* — Crowell & Moring LLP

(57) ABSTRACT

The purpose of the present invention is to provide: a stator for a dynamo-electric machine, with which axial size can be reduced; and, an electrically powered wheel provided with the stator for the dynamo-electric machine. A stator 10 for a dynamo-electric machine is provided with a stator core 100, a plurality of coils 201A-201D, and jumper wires 202A-202C. The stator core 100 has first teeth 101 around which a coil is wound and second teeth 102 around which a coil is not wound. The first teeth 101 and the second teeth 102 are disposed alternatingly in the circumferential direction. The jumper wire 202 extends circumferentially and radially with a bent section to absorb variations in the spacing between one coil and another, and is disposed at a position overlapping the second teeth 102 when viewed from the axial
(Continued)

direction of the dynamo-electric machine. Further, the jumper wire 202 is disposed closer to the stator core 100 relative to an axial end of a coil at least partially wound around the first teeth 101.

12 Claims, 10 Drawing Sheets

(58) Field of Classification Search
USPC .......................................................... 310/98
See application file for complete search history.

(56) References Cited

U.S. PATENT DOCUMENTS

| | | | | |
|---|---|---|---|---|
| 10,063,117 | B2* | 8/2018 | Nakayama | ............... H02K 3/28 |
| 10,505,424 | B2* | 12/2019 | Tamura | .................... H02K 1/16 |
| 12,334,790 | B2* | 6/2025 | Mizukami | ............. H02K 1/146 |
| 2008/0315704 | A1 | 12/2008 | Vollmer | |
| 2009/0174280 | A1 | 7/2009 | Prudham | |
| 2015/0162793 | A1 | 6/2015 | Hashimoto et al. | |
| 2017/0353071 | A1* | 12/2017 | Saito | ......................... H02K 3/28 |
| 2018/0375397 | A1* | 12/2018 | Nakayama | ........... H02K 15/064 |
| 2020/0127523 | A1* | 4/2020 | Toya | ........................ H02K 3/12 |
| 2022/0069651 | A1* | 3/2022 | Saito | ....................... B60L 50/51 |
| 2022/0181938 | A1* | 6/2022 | Nakashima | .............. H02K 3/24 |

FOREIGN PATENT DOCUMENTS

| | | |
|---|---|---|
| JP | 2009-532010 A | 9/2009 |
| JP | 2014-11934 A | 1/2014 |

OTHER PUBLICATIONS

International Search Report (PCT/ISA/210) issued in PCT Application No. PCT/JP2022/001070 dated Mar. 8, 2022 with English translation (4 pages).

Japanese-language Written Opinion (PCT/ISA/237) issued in PCT Application No. PCT/JP2022/001070 dated Mar. 8, 2022 with English translation (6 pages).

* cited by examiner

STATOR FOR DYNAMO-ELECTRIC MACHINE, DYNAMO-ELECTRIC MACHINE, ELECTRIC DRIVE SYSTEM, AND ELECTRIFIED WHEEL

TECHNICAL FIELD

The present invention relates to a stator for a dynamo-electric machine, a dynamo-electric machine, an electric drive system, and an electrified wheel.

BACKGROUND ART

As background art in the present technical field, a winding coil described in JP 2004-274965 A (PTL 1) is known. PTL 1 discloses a technique of cutting a block of a cylindrical conductor, which can be fitted on teeth, in such a way as to form spiral cut faces corresponding to the thickness of a rectangular wire to manufacture a winding coil made of the rectangular wire. PTL 1 describes that this winding coil is provided as a winding coil that does not increase winding resistance and that prevents a temperature rise caused by heat generation (see Abstract).

PTL 1 discloses also a manufacturing technique by which a buffer material is formed between two winding coils to form the two winding coils into an integral structure. According to this manufacturing technique, fitting the two winding coils on teeth is made easy by forming the coils in conformity to an angle at which the teeth, on which the coils are fitted, face each other and to the curvature of a stator iron core. In addition, by making the buffer band (material) formed between the two winding coils expandable/contractible, even if a slight difference in curvature or the like exists between the two winding coils and the stator iron core, the two winding coils can be fitted to the stator iron core easily and securely (see paragraphs 0018 to 0023 and FIG. 5).

CITATION LIST

Patent Literature

PTL 1: JP 2004-274965 A

SUMMARY OF INVENTION

Technical Problem

According to the winding coil of PTL 1, the two winding coils can be fitted to the stator iron core easily and securely by forming the two coils in conformity to the angle at which the teeth, on which the coils are fitted, face each other and to the curvature of the stator iron core and by making the buffer band formed between the two winding coils expandable/contractible.

However, according to the winding coil of PTL 1, the buffer band (jumper wire) formed between the two winding coils protrudes further toward outside of the stator than coil ends in an axis direction (a direction along the rotation axis of the dynamo-electric machine), which leads to an increase in the axial size of the stator iron core and therefore to an increase in the axial size of the dynamo-electric machine.

An object of the present invention is to provide a stator for a dynamo-electric machine, the stator allowing a reduction in an axial size, and an electrified wheel including the stator for the dynamo-electric machine.

Solution to Problem

In order to achieve the above object, a rotor for a dynamo-electric machine of the present invention is a stator for a dynamo-electric machine, the stator including a stator core, a plurality of coils, and a plurality of jumper wires that electrically connect adjacent coils among the plurality of coils to each other.

The stator core includes a plurality of first teeth each of which is formed in such a way as to have an inner periphery side and an outer periphery side of a constant width and is wound with a coil, and a plurality of second teeth each of which is not wound with the coil.

The first teeth and the second teeth are arranged alternately in a circumferential direction.

The jumper wires each have a bent part and extend in the circumferential direction and a radial direction so as to absorb a change in an interval between one coil and another coil of two coils wound around the first teeth and adjacent to each other, and are disposed at positions that overlap the second teeth in a view in an axis direction of the dynamo-electric machine.

Each of the jumper wires at least has a part thereof located closer to the stator core than ends in the axis direction of coils wound around the first teeth.

Advantageous Effects of Invention

According to the present invention, a stator for a dynamo-electric machine, the stator allowing a reduction in an axial size, and an electrified wheel including the stator for the dynamo-electric machine can be provided.

Problems, configurations, and effects that are not described above will be made clear by the following description of embodiments.

DESCRIPTION OF EMBODIMENTS

Figure 13:
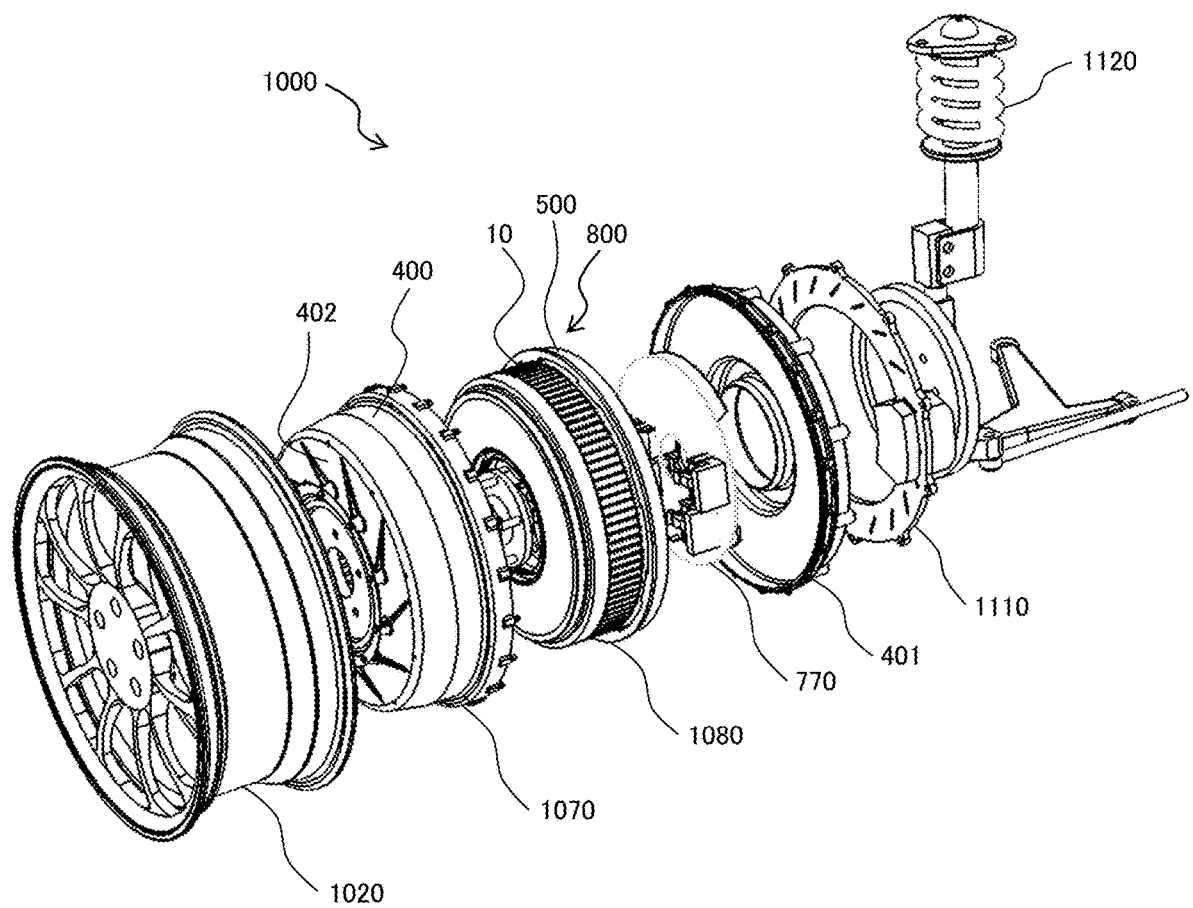
FIG. 13 is an exploded view showing the electrified wheel 1000 of FIG. 12 disassembled along a rotation axis.
Figure 14:
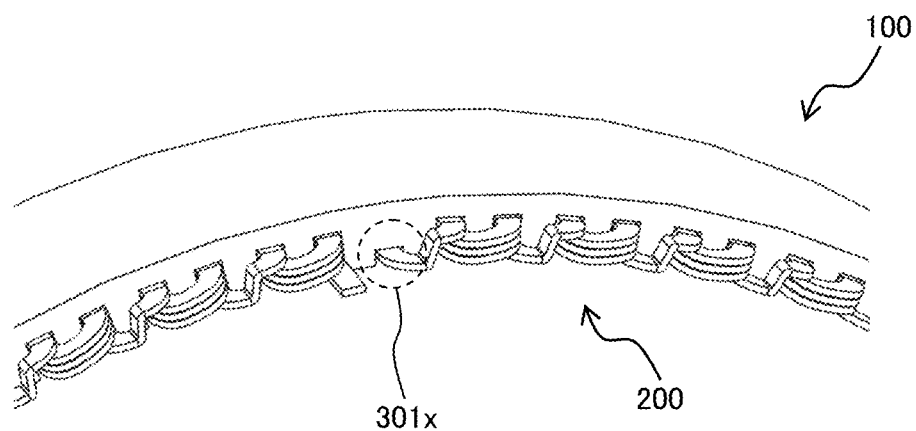
FIG. 14, which is a diagram of a comparison example compared to the diagram according to the present invention, is a perspective view showing a state of the continuous coil 200 attached to the stator core 100.
Figure 15:
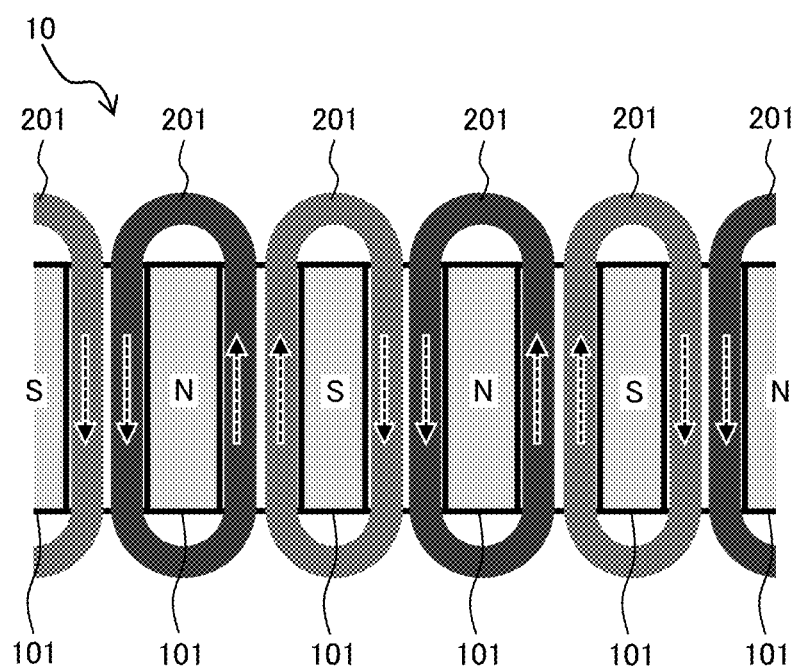
FIG. 15, which is a diagram of a comparison example compared to the diagram according to the present invention, depicts the inner peripheral surface side of the stator 10 seen in the direction of heading from the center of the stator 10 toward outside in the radial direction, showing a development in which the inner peripheral surface of the stator 10 is developed on a plane.

Embodiments of the present invention will be described with reference to FIGS. 1 to 15. FIGS. 1 to 13 are diagrams of an embodiment of the present invention, and FIGS. 14 and 15 are diagrams of comparative examples for describing the present invention.

In the following description, an "axis direction" is a direction along the rotation axis of a rotor, that is, a direction along the rotation axis of a dynamo-electric machine, and may be referred to as an "axial direction".

Figure 1:
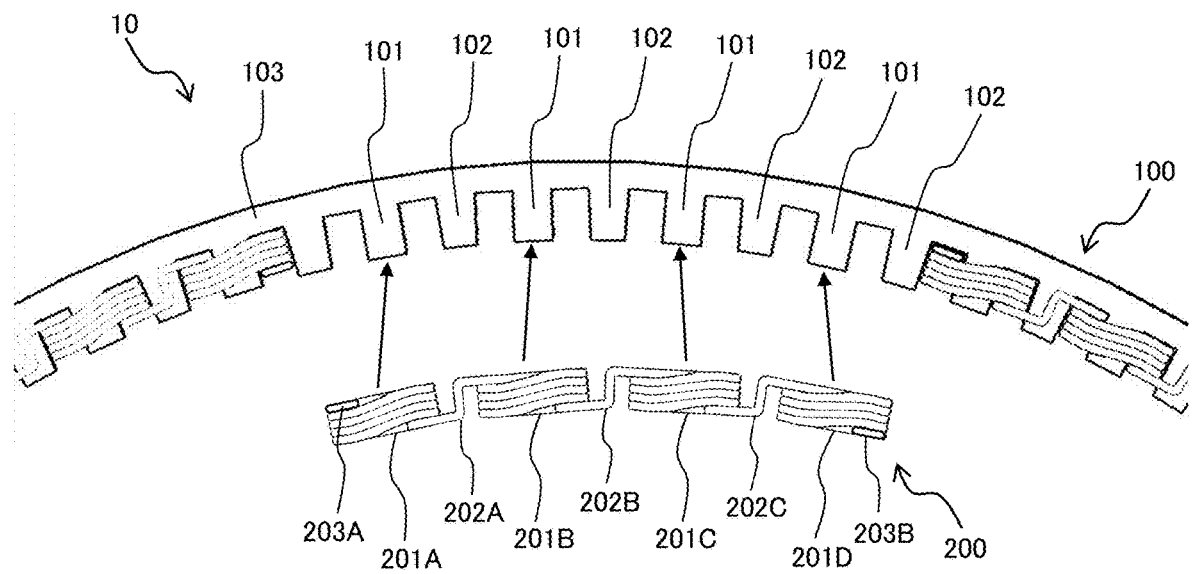
FIG. 1, which is a diagram according to the present invention, is a plan view of a stator 10 seen in a direction perpendicular to an axis direction, showing a state of a continuous coil 200 before and after its attachment to a stator core 100.
Figure 2:
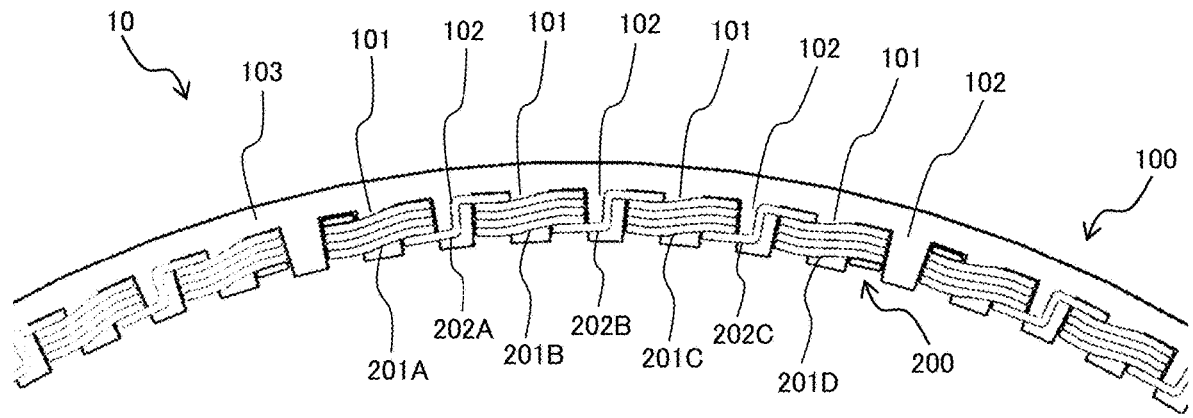
FIG. 2, which is a diagram according to the present invention, is a plan view of the stator 10 seen in the direction perpendicular to the axis direction, showing a state of the continuous coil 200 after its attachment to the stator core 100.

A stator 10, a stator core 100, and a continuous coil 200 of an embodiment according to the present invention will be described, with reference to FIGS. 1 and 2. FIG. 1, which is a diagram according to the present invention, is a plan view of the stator 10 seen in a direction perpendicular to the axis direction, showing a state of the continuous coil 200 before and after its attachment to the stator core 100. FIG. 2, which is a diagram according to the present invention, is a plan view of the stator 10 seen in the direction perpendicular to the axis direction, showing a state of the continuous coil 200 after its attachment to the stator core 100.

The stator 10 of the dynamo-electric machine of this embodiment includes the stator core 100, a plurality of coils 201A, 21-B, 201 C, and 201 D, and a plurality of jumper wires 202A, 202B, and 202C that electrically connect adjacent coils among the plurality of coils 201A, 21-B, 201C, and 201D. The stator core 100 includes a plurality of first teeth 101 each of which is formed in such a way as to have an inner periphery side and an outer periphery side of a constant width and which are wound with the coils 201A, 21-B, 201C, and 201D, and a plurality of second teeth 102 not wound with the coils 201A, 21-B, 201C, and 201D.

In this embodiment, the continuous coil 200 in which the plurality of coils 201A, 21-B, 201C, and 201D are connected together is attached to the stator core 100 to construct the stator 10. The plurality of coils 201A, 201B, 201C, and 201D are connected via the jumper wires 202A, 202B, and 202C.

Figure 10:
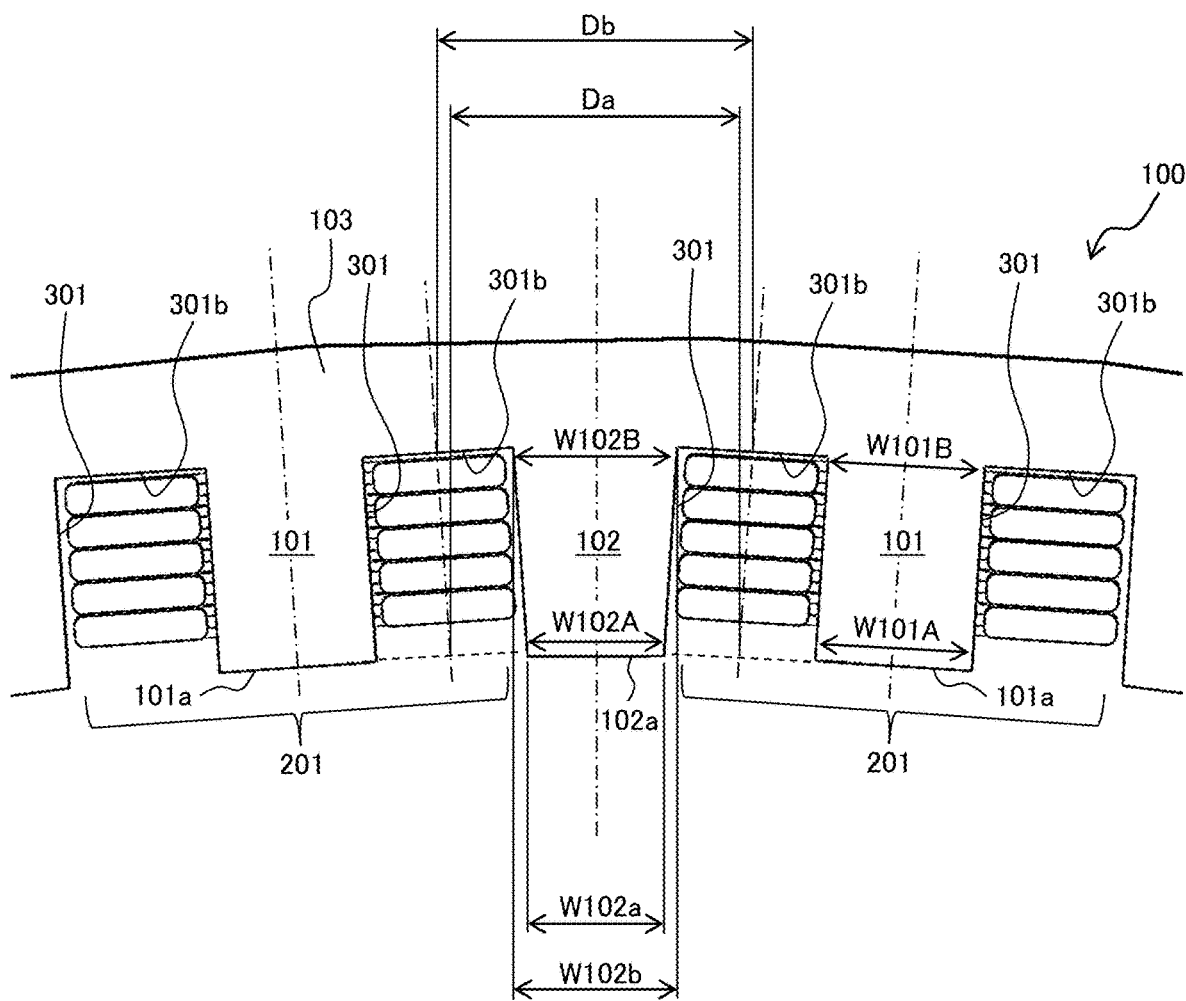
FIG. 10, which is a diagram according to the present invention, is a sectional view of the stator core 100, the sectional view being perpendicular to the axis direction and showing teeth 101 and 102 and coils 201 wound around the teeth 101.

A copper wire is used in many cases as a wire rod making up each coil 201. An aluminum wire or the like, however, may also be used as the wire rod. The jumper wires 202A, 202B, and 202C are conductors that are interposed between the coils 201A, 201B, 201C, and 201D to connect them. In this embodiment, when the coils 201A, 201B, 201C, and 201D are inserted in slots 301 (see FIG. 10), a change in an interval (circumferential length) between adjacent slots 301 (see FIG. 10 showing a change from an interval Da to an interval Db) is absorbed by the jumper wire 202. It is preferable that the jumper wires 202A, 202B, and 202C be made of the same material making up the coils 201A, 201B, 201C, and 201D and that the jumper wires 202A, 202B, and 202C be constituted of an elastic material with low electrical resistivity, such as copper or aluminum.

FIGS. 1 and 2 show an example in which four coils 201A, 201B, 201C, and 201D and three jumper wires 202A, 202B, and 202C are formed from one conductor (wire rod) to construct one continuous coil 200. The number of coils making up the continuous coil 200 is, however, not limited to four. For example, 2, 3, 4, or 5 coils may be used to construct one continuous coil 200.

The continuous coil 200 in which a plurality of coils are connected together is attached the stator core 100. In other words, the continuous coil 200 is in a state of having the plurality of coils connected together before being attached to the stator core 100.

Figure 3:
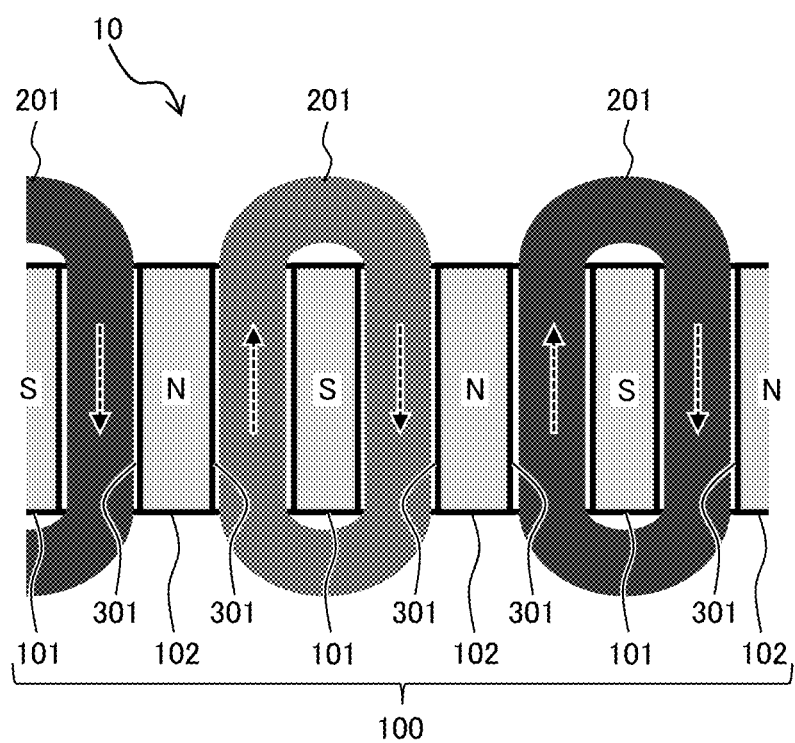
FIG. 3, which is a diagram according to the present invention, depicts an inner peripheral surface side of the stator 10 seen in the direction of heading from the center of the stator 10 toward outside in a radial direction, showing a development in which the inner peripheral surface of the stator 10 is developed on a plane.

Arrangement of individual coils 201 making up the continuous coil 200 will be described with reference to FIG. 3. FIG. 3, which is a diagram according to the present invention, depicts an inner peripheral surface side of the stator 10 seen in the direction of heading from the center of the stator 10 toward outside in a radial direction, showing a development in which the inner peripheral surface of the stator 10 is developed on a plane.

The stator core 100 is provided with a plurality of teeth. The plurality of teeth includes the plurality of first teeth 101, the plurality of second teeth 102, and a core back 103 (see FIG. 1) that connects the plurality of first teeth 101 to the plurality of second teeth 102. The teeth 101 and the teeth 102 are arranged alternately in a circumferential direction, and the slots 301, into which the coils 201 are inserted respectively, are each formed between the tooth 101 and the tooth 102.

As it can be understood from FIG. 3, the teeth 101 are wound respectively with the coils 201 while the teeth 102 are not wound with the coils 201. In other words, the coil 201 is wound around each of the teeth 101 among the plurality of teeth 101 and 102 arranged in the circumferential direction, that is, wound around each of the teeth 101 arranged such that one tooth 102 is interposed between every pair of teeth 101. A current flows through each coil 201 in the same direction, as indicated by arrows, and the teeth 101 and the teeth 102 are magnetized in opposite polarities. As a result, the S poles and N poles are generated on front ends (inner periphery side ends) of the teeth 101 and front ends (inner periphery side ends) of the teeth 102, respectively, and are therefore arranged alternately.

FIG. 3 shows an example in which the front ends of the teeth 101 are magnetized to the S poles and the same of the teeth 102 are magnetized to the N poles, respectively. However, the coils 201 may be supplied with a current such that the teeth 101 and the teeth 102 are magnetized to the N poles and the S poles, respectively, which is reverse to the direction of magnetization in the above example. In any case, the direction of winding of the coils 201 and the direction of current flows in the coils 201 are determined so that the N poles and the S poles are arranged alternately in correspondence with the plurality of teeth arranged in the circumferential direction.

Figure 4A:
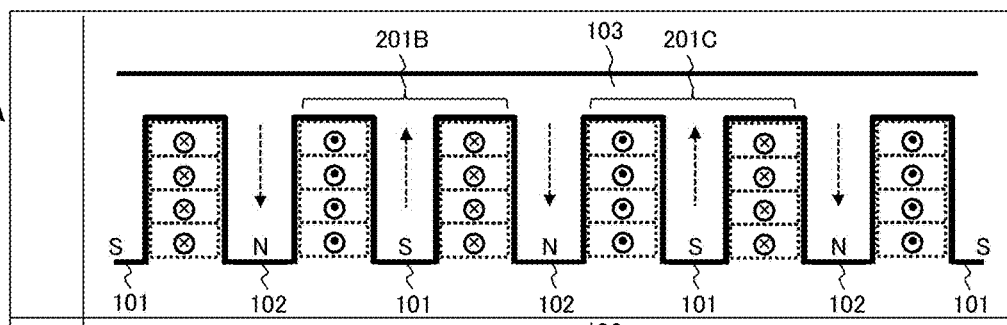
FIGS. 4A to 4C, which are diagrams according to the present invention, is an explanatory diagram of a method of connecting jumper wires 202A to 202C of the coil 200 in the stator 10.
Figure 4B:
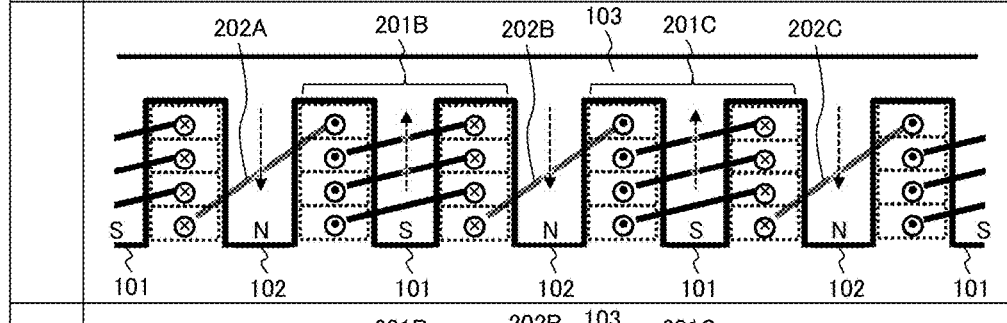
Figure 4C:
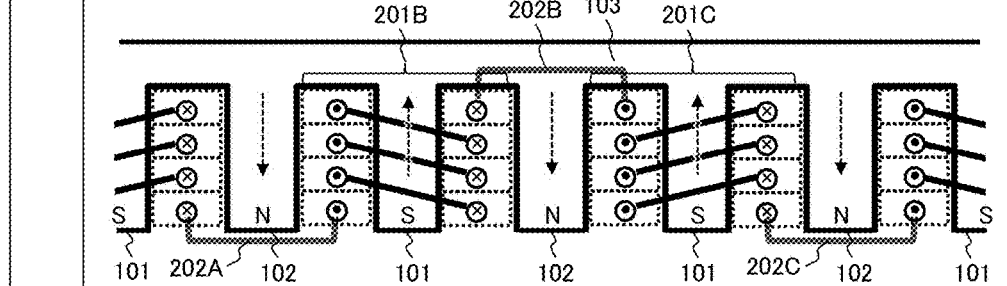

Connection patterns of the jumper wires 202A to 202C will then be described with reference to FIGS. 4A to 4C. FIGS. 4A to 4C, which are diagrams according to the present invention, is an explanatory diagram of a method of connecting the jumper wires 202A to 202C of the coil 200 in the stator 10.

FIG. 4A depicts the coils in the slots only without showing the jumper wires. 201B denotes one coil, and 201C denotes a coil adjacent to the coil 201B. As a result of current flowing in the coils 201B and 201C, as shown in FIG. 4A, the tooth 101 and tooth 102 are magnetized in directions shown in FIG. 4A. Specifically, the front end of the tooth 101 is magnetized to the S pole, while the front end of the tooth 102 is magnetized to the N pole.

FIG. 4B shows a configuration in which, in a combination of two coils 201B and 201C, an end of one coil 201C that is closer to the other coil 201B is located on an outer periphery side part of the first tooth 101 in the radial direction of the stator core 100, the first tooth 101 being wound with the one coil 201C, an end of the other coil 201B that is closer to the one coil 201C is located on an inner periphery side part of the first tooth 101 in the radial direction of the stator core 100, the first tooth 101 being wound with the other coil 201B, and the jumper wire 202B has a bent part 202b and extends in the circumferential direction and the radial direction so as to absorb a change in an interval between the one coil 201C and the other coil 201B, and is disposed at a position that overlaps the second tooth 102 in a view in the axis direction of the dynamo-electric machine. A part of jumper wire 202B that extends in the circumferential direction corresponds to a part 202a shown in FIG. 6, and a part of jumper wire 202B that extends in the radial direction corresponds to a part 202c shown in FIG. 6.

FIG. 4C shows a configuration in which, in a combination of two coils 201B and 201C, an end of one coil 201B that is closer to the other coil 201C and an end of the other coil 201C that is closer to the one coil 201B are located on either respective outer periphery side parts or inner periphery side parts (on the outer periphery side parts in FIG. 4C) of the first teeth 101 in the radial direction of the stator core 100, the first teeth 101 being wound respectively with the one coil 201B and the other coil 201C, and both ends of the jumper wire 202B are located on either respective outer periphery side parts or inner periphery side parts (on the outer periphery side parts in FIG. 4C) of the first teeth 101 wound respectively with the coil 201B and coil 201C, to connect the end of the one coil 201B to the end of the other coil 201C. In this case, the jumper wire 202B extends mainly in the circumferential direction and may have a radial component small in extension length relative to a circumferential component with a long extension length.

Figure 5:
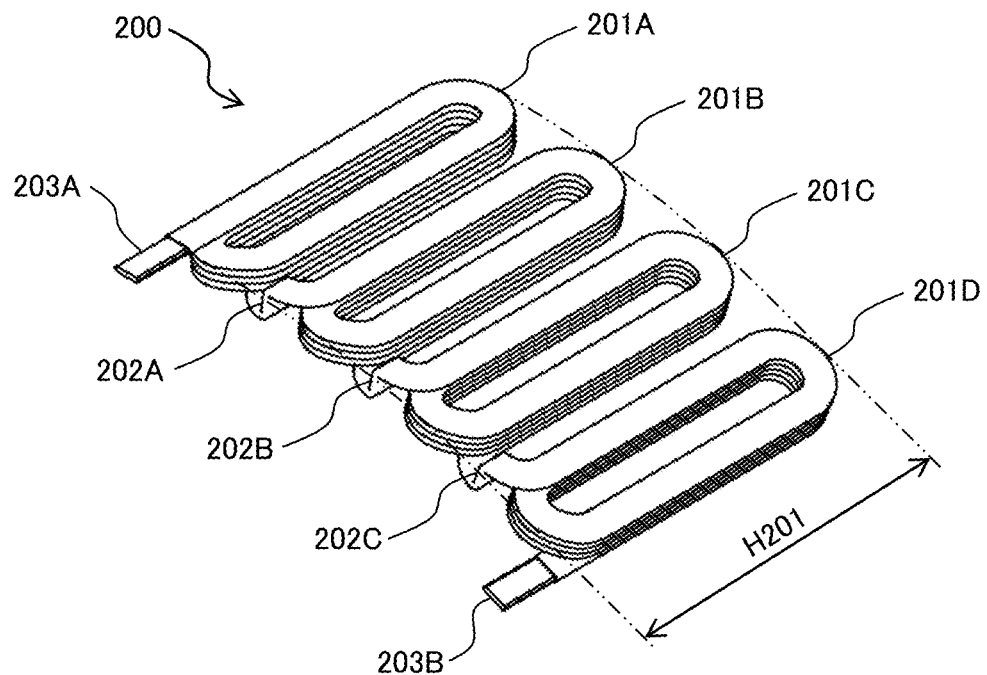
FIG. 5, which is a diagram according to the present invention, is a perspective view showing an appearance of the continuous coil 200.

The continuous coil 200 shown in FIG. 4B will be described with reference to FIGS. 5 and 6. FIG. 5, which is a diagram according to the present invention, is a perspective view showing an appearance of the continuous coil 200 FIG. 6, which is a diagram according to the present invention, is a partially enlarged view showing an enlarged view of the jumper wire 202 of the continuous coil 200.

The continuous coil 200 includes the coils 201A, 201B, 201C, and 201D, the jumper wires 202A, 202B, and 202C, an extension line 203A extended out of the coil 201A, and an extension line 203B extended out of the coil 201D. The coils 201A, 201B, 201C, and 201D, the jumper wires 202A, 202B, and 202C, the extension line 203A extended out of the coil 201A, and the extension line 203B extended out of the coil 201D are molded out of one conductor (wire rod).

By integrally molding the continuous coil 200 out of one conductor, a welding process and a process of coating a welded part with an insulation film can be dispensed with. In addition, the reliability of the stator and therefore that of the dynamo-electric machine can be improved.

The continuous coil 200 shown in FIG. 5 is disposed such that a part where the extension line 203A is extended out of the coil 201A is located on the outer periphery side of the stator core 100, while a part where the extension line 203B is extended out of the coil 201D is located on the inner periphery side of the stator core 100.

In a combination of the coils 201A and 201B, an end of one coil 201B that is closer to the other coil 201A is located on an outer periphery side part of the first tooth 101 wound with the one coil 201B, an end of the other coil 201A that is closer to the one coil 201B is located on an inner periphery side part of the first tooth 101 wound with the other coil 201A, and the jumper wire 202A has the bent part 202b (see FIG. 6) and extends in the circumferential direction and the radial direction so as to absorb a change in an interval between the one coil 201B and the other coil 201A, and is disposed at a position that overlaps the second tooth 102 in a view in the axis direction of the dynamo-electric machine. A part of jumper wire 202A that extends in the circumferential direction corresponds to the part 202a shown in FIG. 6, and a part of jumper wire 202A that extends in the radial direction corresponds to the part 202c shown in FIG. 6.

In a combination of the coils 201B and 201C, an end of one coil 201C that is closer to the other coil 201B is located on an outer periphery side part of the first tooth 101 wound with the one coil 201C, an end of the other coil 201B that is closer to the one coil 201C is located on an inner periphery side part of the first tooth 101 wound with the other coil 201B, and the jumper wire 202B has the bent part 202b (see FIG. 6) and extends in the circumferential direction and the radial direction so as to absorb a change in an interval between the one coil 201C and the other coil 201B, and is disposed at a position that overlaps the second tooth 102 in a view in the axis direction of the dynamo-electric machine. A part of jumper wire 202B that extends in the circumferential direction corresponds to a part 202a shown in FIG. 6, and a part of jumper wire 202B that extends in the radial direction corresponds to a part 202c shown in FIG. 6.

In a combination of the coils 201C and 201D, an end of one coil 201D that is closer to the other coil 201C is located on an outer periphery side part of the first tooth 101 wound with the one coil 201D, an end of the other coil 201C that is closer to the one coil 201D is located on an inner periphery side part of the first tooth 101 wound with the other coil 201C, and the jumper wire 202C has the bent part 202b (see FIG. 6) and extends in the circumferential direction and the radial direction so as to absorb a change in an interval between the one coil 201D and the other coil 201C, and is disposed at a position that overlaps the second tooth 102 in a view in the axis direction of the dynamo-electric machine.

Figure 6:
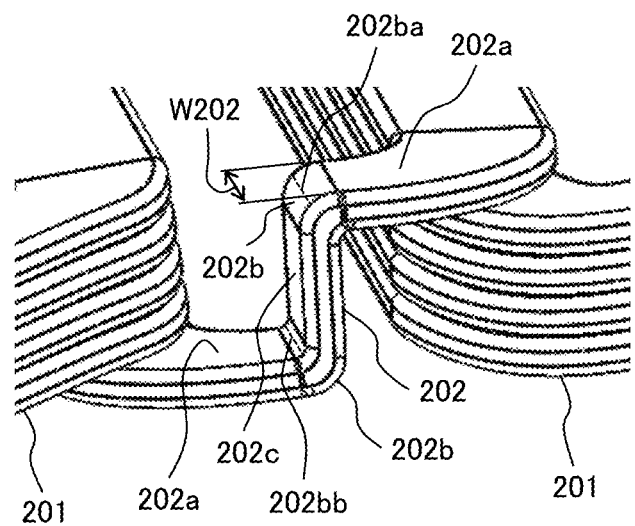
FIG. 6, which is a diagram according to the present invention, is a partially enlarged view showing an enlarged view of a jumper wire 202 of the continuous coil 200.

Apart of jumper wire 202C that extends in the circumferential direction corresponds to the part 202a shown in FIG. 6, and a part of jumper wire 202C that extends in the radial direction corresponds to the part 202c shown in FIG. 6.

Further, in the above configuration, each of the jumper wires 202A, 202B, and 202C at least has a part thereof located closer to the stator core 100 than ends in the axis direction of the coils 201A, 201B, 201C, and 201D wound around the first teeth 101. In this embodiment, as shown in FIG. 5, each of the jumper wires 202A, 202B, and 202C is entirely located closer to the stator core 100 than the ends in the axis direction of the coils 201A, 201B, 201C, and 201D wound around the first teeth 101, and is within a coil height size H201. This configuration is made possible by providing the second teeth 102 not wound with the coils 201 and arranging the jumper wires 202 such that they overlap the second teeth 102 in a view in the axis direction.

FIG. 15, which is a diagram of a comparison example compared to the diagram according to the present invention, depicts the inner peripheral surface side of the stator 10 seen in the direction of heading from the center of the stator 10 toward outside in the radial direction, showing a development in which the inner peripheral surface of the stator 10 is developed on a plane.

In the comparison example shown in FIG. 15, all teeth 101 are wound respectively with the coils 201, which creates a row of the N poles and S poles lined up alternately. In this case, spaces where the jumper wires are placed (i.e., the slots not wound with the coils 201) are not present, and consequently the jumper wires stick out widely from the coil ends in the axis direction.

As shown in FIG. 6, the bent part 202b is bent along a long side direction such that a folding line 202ba is along the long side direction of the jumper wire 202 (which will be described with reference to FIG. 10).

In this example, the length of a central part (radially extending part) 202c of the jumper wire 202 can be secured as the length equal to a radial distance between the outer periphery side position and the inner periphery side position of the coil 201. The longer the central part 202c of the jumper wire 202 is, the easier the circumferential deformation of the jumper wire 202 becomes. This facilitates attachment of the continuous coil 200 to the stator core 100.

Figure 7:
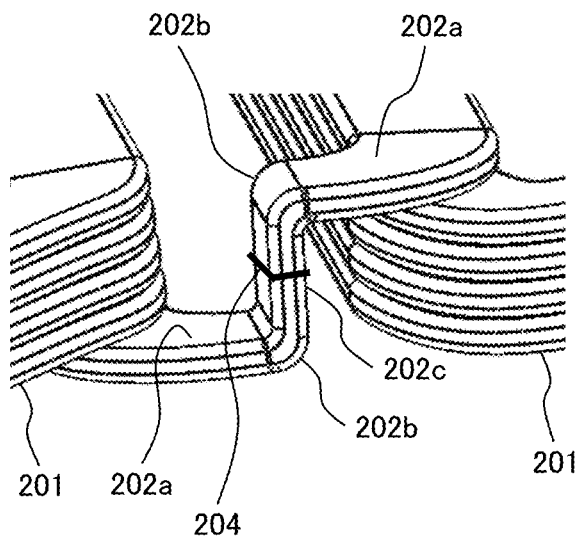
FIG. 7, which is a diagram according to the present invention, is a partially enlarged view showing a modification of the jumper wire 202 of the continuous coil 200.

A modification of the continuous coil 200 will be described with reference to FIG. 7. FIG. 7, which is a diagram according to the present invention, is a partially enlarged view showing a modification of the jumper wire 202 of the continuous coil 200.

In this modification, each jumper wire 202 is provided with at least one junction 204 and a plurality of coil components are joined to construct the continuous coil 200. Specifically, a plurality of unit coils 201 with the jumper wire 202 cut on the vicinity of its center are molded and are welded together before being attached to the stator core 100 to manufacture the continuous coil 200 constituted of the unit coils 201 connected to each other.

In the embodiment according to the present invention, welding is not performed after the coils 201 are attached to the stator core 100. Welding before attachment of the coils 201 to the stator core 100 is, however, allowed. The configuration shown in FIG. 7 is, therefore, also included in the embodiment of the present invention. In addition, for example, the coil 201 may be formed by winding one conductor edgewise or may be manufactured by welding pieces of single L-shaped coils or annular coils.

Further, the continuous coil 200 may be manufactured in such a way that the coils 201 and the jumper wires 202 are separately molded and are welded together before being attached to the stator core 100.

The connection method is not limited to welding, and may be executed as brazing or soldering. TIG welding, laser welding, electron beam welding, and the like are applicable as the welding method.

By manufacturing individual coils 201 separately and joining these coils 201 by welding or the like before attaching them to the stator core 100, the moldability of a single coil 201 can be ensured as welding after attachment of the coils 201 to the stator core 100 is avoided. In other words, in molding of the single coil 201 and the continuous coil 200, the single coil 201 is more easy to mold in many cases. It should be noted, however, that when the processes of welding and insulation film coating are taken into consideration, integrally molding the continuous coil 200 is advantageous in some cases.

A modification of the continuous coil 200 will be described with reference to FIGS. 8 and 9.

Figure 8:
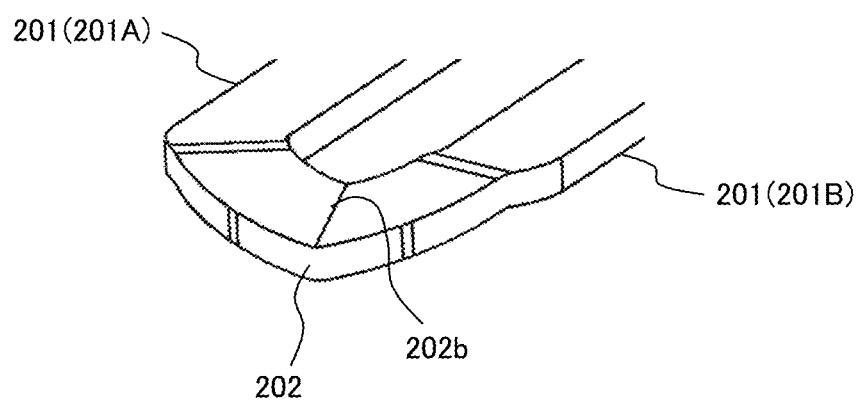
FIG. 8, which is a diagram according to the present invention, is a partially enlarged view showing a modification of the jumper wire 202 of the continuous coil 200, the modification showing one jumper wire 202 and ends of coils 201 connected to the jumper wire 202.

FIG. 8, which is a diagram according to the present invention, is a partially enlarged view showing a modification of the jumper wire 202 of the continuous coil 200, the modification showing one jumper wire 202 and ends of coils 201 connected to the jumper wire 202.

FIG. 8 shows a configuration of the jumper wire 202 of the connection pattern described in FIG. 4C. An end of one coil 201 (201A) that is closer to the other coil 201 (201B), both coils making up the continuous coil 200, and an end of the other coil 201 (201B) that is closer to the one coil 201 (201A) are located on either respective outer periphery side parts or inner periphery side parts of the first teeth 101 wound respectively with the one coil 201A and the other coil 201B. In this case, both ends of the jumper wire 202 are located on either respective outer periphery side parts or inner periphery side parts of the first teeth 101 wound respectively with the one coil 201A and the other coil 201B, to connect the end of the one coil 201A to the end of the other coil 201B.

In this case, to allow the circumferential interval between the coils 201 to change easily when the continuous coil 200 is inserted in the slots 301 of the stator core, a V-shaped groove (bent part) 202b is formed at the center in the circumferential direction of the jumper wire 202. Specifically, the V-shaped groove (bent part) 202b makes up a bent part 201b that absorbs a change in the interval between the one coil 201A and the other coil 201B, and the presence of the V-shaped bent part 201b allows the jumper wire 202 to extend in the circumferential direction and the radial direction.

Figure 9:
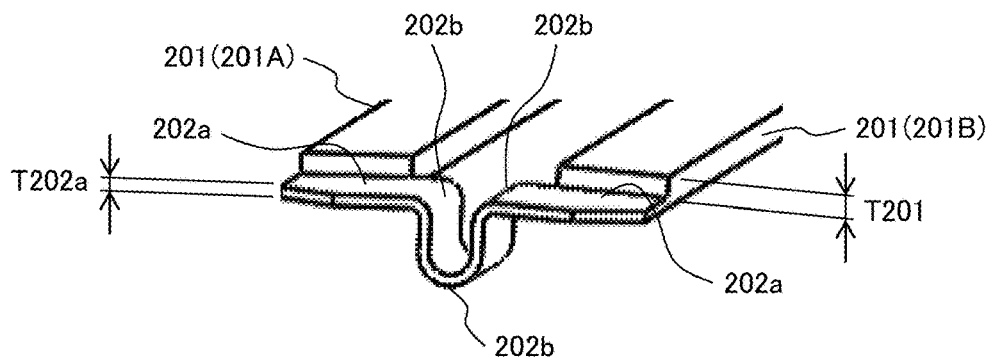
FIG. 9, which is a diagram according to the present invention, is a partially enlarged view showing a modification of the jumper wire 202 of the continuous coil 200, the modification showing one jumper wire 202 and ends of coils 201 connected to the jumper wire 202.

FIG. 9, which is a diagram according to the present invention, is a partially enlarged view showing a modification of the jumper wire 202 of the continuous coil 200, the modification showing one jumper wire 202 and ends of coils 201 connected to the jumper wire 202.

As shown in FIG. 9, the conductor section size of the coil 201 and the conductor section size of the jumper wire 202 may be different from each other.

In the examples shown in FIGS. 6 and 7, the conductor length of the jumper wire 202 is large, which increases its electrical resistance. In the examples shown in FIGS. 8 and 9, on the other hand, the conductor length of the jumper wire 202 can be made small, which reduces its electrical resistance.

The shape of the teeth 101 and 102 and the sectional shape of the wire rod making up the coil 201 will be described with reference to FIG. 10. FIG. 10, which is a diagram according to the present invention, is a sectional view of the stator core 100, the sectional view being perpendicular to the axis direction and showing the teeth 101 and 102 and the coils 201 wound around the teeth 101.

The first tooth 101 is the tooth wound with the coil 201. In this embodiment, the first tooth 101 is formed into a parallel tooth in order to fit the coil 201 on the first tooth 101. The parallel tooth refers to a tooth of which a circumferential width W101A on the inner periphery side and a circumferential width W101B on the outer periphery side are of the same size and both side surfaces are parallel with each other. By forming the first tooth 101 into the parallel tooth, the coil 201 can be fitted onto the first tooth 101 without being deformed. In addition, the space factor of the coil 201 can be increased. When the first tooth 101 is formed into a trapezoidal tooth, a dead space is likely to arise, in which case the space factor of the coil 201 drops.

The second tooth 102 is the tooth not wound with the coil 201. It is preferable that to improve the space factor of the coil 201, the second tooth 102 be formed as a trapezoidal tooth. The trapezoidal tooth is a tooth whose circumferential width on the inner periphery side is smaller than whose circumferential width on the outer periphery side. A circumferential width W102A on the inner periphery side of the second tooth 102 is therefore smaller than a circumferential width W102B on the outer periphery side of the same. By forming the second tooth 102 into the trapezoidal tooth, the space factor of the coil 201 in the slots 301 can be increased.

Because the slots 301 needed to be open slots in which the coil 201 is inserted, neither the first tooth 101 nor the second tooth 102 is provided with a projection in the circumferential direction. If the slots 301 are semi-closed slots, this embodiment is not executable.

According to the continuous coil 200 of this embodiment, the sectional shape of the coil 201 and that of the jumper wire 202 are rectangles each having long sides and short sides. In this case, the coil 201 is wound such that the long sides of the section of the coil 201 are along the circumferential direction in a view in the axis direction of the dynamo-electric machine.

Using the coil 201 having a rectangular sectional shape allows an increase in the space factor of the coil 201 in the slots 301. In addition, using an edgewise coil (a coil formed by bending a rectangular wire toward the short side of its section) allows a reduction in the radial length of the tooth. Hence the output density of the dynamo-electric machine can be improved.

It is assumed in this embodiment that the coil 201 is provided as a flat edgewise coil formed out of an enameled rectangular wire. However, the wire rod of the coil 201 is not limited to an enameled wire, a rectangular wire, an edgewise coil, or the like, and may be a non-coated copper wire, a round wire, or the like. In FIG. 10, the wire rod is tuned five times around one tooth 101. In FIG. 10, one coil 201 is placed in one slot. A plurality of coils 201, however, may be present in the circumferential direction in one slot 301. When the coil 201 is removed from the first tooth 101 and is seen in the radial direction, the coil 201 is observed as an elliptical coil.

The winding width of the coil 201 is constant on the inner periphery side of the slot 301 and on the outer periphery side of the same.

It is not always necessary that a commercially available rectangular wire be used as the wire rod of the continuous coil 200. A rectangular wire rod whose section has long sides and short sides may be fabricated and used.

Figure 11:
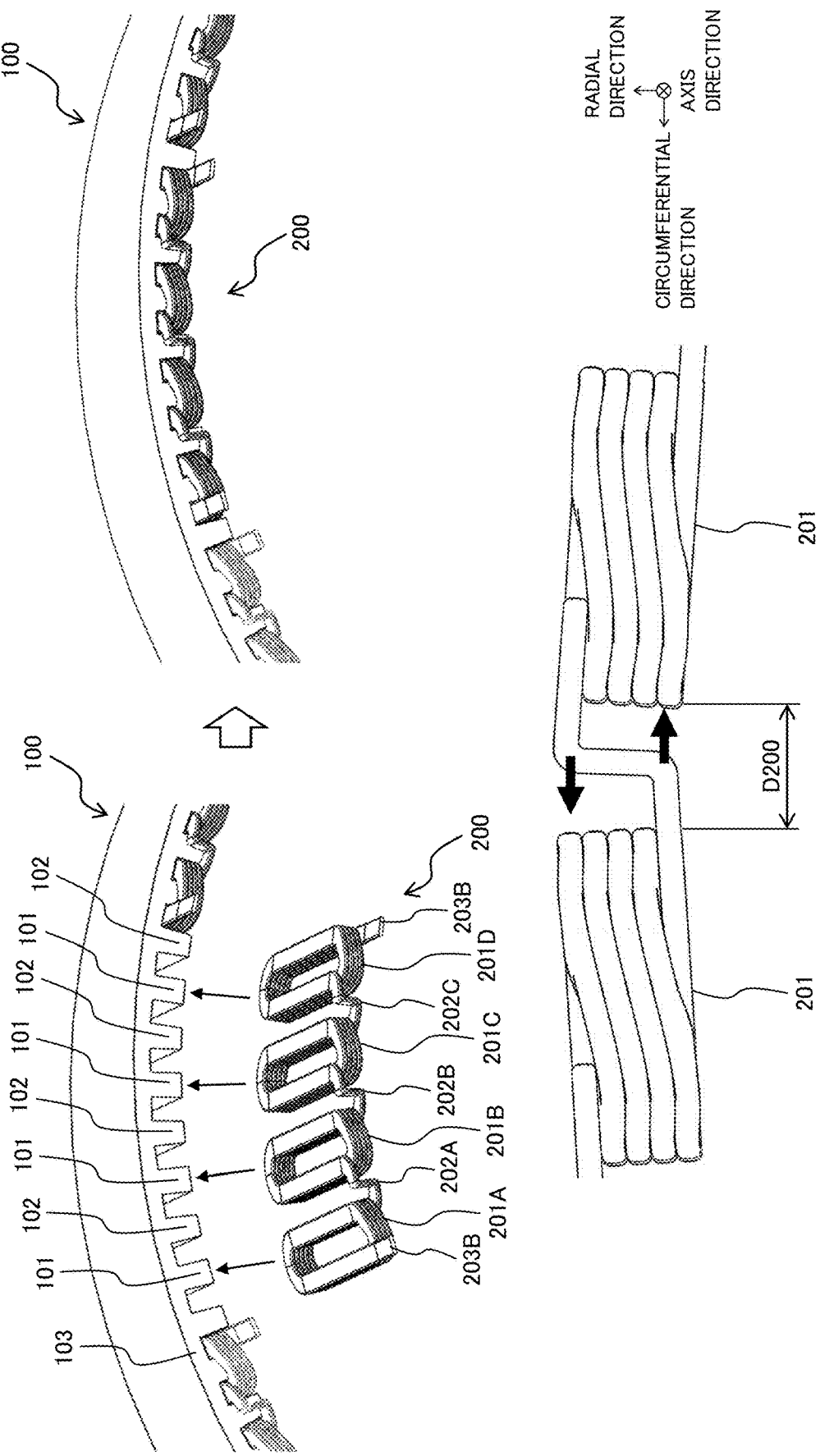
FIG. 11, which is a diagram according to the present invention, is an explanatory diagram of a method of solving a problem that arises when the continuous coil 200 is attached to the stator core 100.

A problem that arises when the continuous coil 200 is attached to the stator core 100 will be described with reference to FIG. 1 and FIG. 11. FIG. 11, which is a diagram according to the present invention, is an explanatory diagram of a method of solving a problem that arises when the continuous coil 200 is attached to the stator core 100.

As shown in FIG. 10, because the stator core 200 is of an arc shape, an interval between slots 301 into which adjacent coils 201 are inserted changes in the radial direction. Specifically, an interval (circumferential length) Da on the entrance side (radially inner side) (see FIG. 10) of the slot 301 is small while an interval (circumferential length) Db on the innermost side (radially outer side) (see FIG. 10) of the slot 301 is large. This makes inserting the continuous coil 200 into the slots 301 difficult, which makes attaching the continuous coil 200 to the stator core 100 difficult.

In this embodiment, the intervals between the adjacent coils 201 are reduced in the circumferential direction by bending the jumper wires 202, as indicated by arrows in FIG. 11, and then the continuous coil 200 is fitted onto the first teeth 101 of the stator core 100 as the intervals are gradually widen. This process facilitates attachment of the continuous coil 200 to the stator core 100. Specifically, because each jumper wire 202 absorbs the difference between the interval Da and the interval Db, inserting the continuous coil 200 into the slots 301 becomes easy and therefore attaching the continuous coil 200 to the stator core 100 becomes easy.

The number of teeth 101 and 102 will be described with reference to FIGS. 1, 2, and 14. FIG. 14, which is a diagram of a comparison example compared to the diagram according to the present invention, is a perspective view showing a state of the continuous coil 200 attached to the stator core 100.

It is preferable that the total number of teeth including the first teeth 101 and the second teeth 102 be 12 or more and be a multiple of 6.

In a case where the continuous coil 200 is constituted of two coils 201 connected via the jumper wire 202, the minimum number of teeth is 4 for each phase, and therefore the number of teeth needed for three phases, i.e., U, V, and W phases is 12. In a case where the continuous coil 200 is constituted of three coils connected via the jumper wires 202, the number of teeth is 18. In a case where the continuous coil 200 is constituted of four coils connected via the jumper wires 202, the number of teeth is 24. In a case where the continuous coil 200 is constituted of five coils connected via the jumper wires 202, the number of teeth is 30. These numbers of teeth are all multiples of 6.

If the number of teeth is different from those multiples of 6 described above, a slot 301x formed at a part where continuous coils 200 are adjacent to each other is left idle, as shown in FIG. 14, in which case power output from the dynamo-electric machine drops.

According to the coil 201 of this embodiment, when the continuous coil 200 is attached to the stator core 100, deformation of the continuous coil 200 can be absorbed by the jumper wires 202 and therefore welding the coil 201 after attaching it to the stator core 100 is unnecessary. In other words, the coil 201 of this embodiment is manufactured in the form of a structure (continuous coil 200) in which a plurality of coils 201 are connected in advance by winding a single wire rod continuously or a structure in which coil ends of a plurality of coils 201 can be welded before attaching the coils 201 to the stator core 100. The coil 201 and the continuous coil 200 of this embodiment thus offer the following effects.

(1) There is no concern over thermal effects that act on an insulating material, such as a bobbin and an insulation film, during a welding process. When welding is performed on an assembly in which the coils are attached to the stator core, it is necessary to separate a welded part away from an insulating material (e.g., a resin bobbin). This increases the size of the stator, thus increasing the axial length of the dynamo-electric machine. The stator 10 using the continuous coil 200 of this embodiment, however, can be reduced in size.

(2) In the embodiment in which welding is unnecessary, an insulation film treatment on a welded part (recoating with an insulation film) is unnecessary, and therefore the number of steps including a welding step can be reduced. In the embodiment in which the coil ends of the plurality of coils 201 are welded before the coils 201 are attached to the stator core 100, the welding step and insulation film treatment step are necessary but welding can be performed on each single coil 201, which is simpler work, compared to work of welding the assembly (stator) in which the coils are attached to the stator core.

(3) The embodiment in which welding is unnecessary does not raise a concern about a welding failure and a lack of long-term reliability, thus allowing suppression of a cost increase resulting from lower yield. When welding is performed on the assembly in which the coils are attached to the stator core, aligning a welded part precisely is not easy. Because the welded part shifting from the correct position in alignment readily leads to a welding defect, much efforts are made to ensure alignment of the welded part and to examine a welding defect. In this embodiment, efforts made to ensure alignment of the welded part or examine a welding defect is reduced.

(4) In this embodiment in which welding is unnecessary, no welding-related thermal energy is generated. As a result, $CO_2$ emission during the manufacturing process can be significantly reduced.

In addition, because the first teeth wound with the coils 201 and the second teeth not wound with the coils 201 are arranged alternately in the circumferential direction, the jumper wires 202 can be set at the position at which the jumper wires 202 do not project in the axis direction from the coil ends. Hence the dynamo-electric machine can be reduced in size.

Because the stator 10 of this embodiment offers the above-described effects, applying the stator 10 to an electrified wheel (in-wheel motor) allows a reduction in the cost of the electrified wheel and an improvement in the power density of the electrified wheel.

Figure 12:
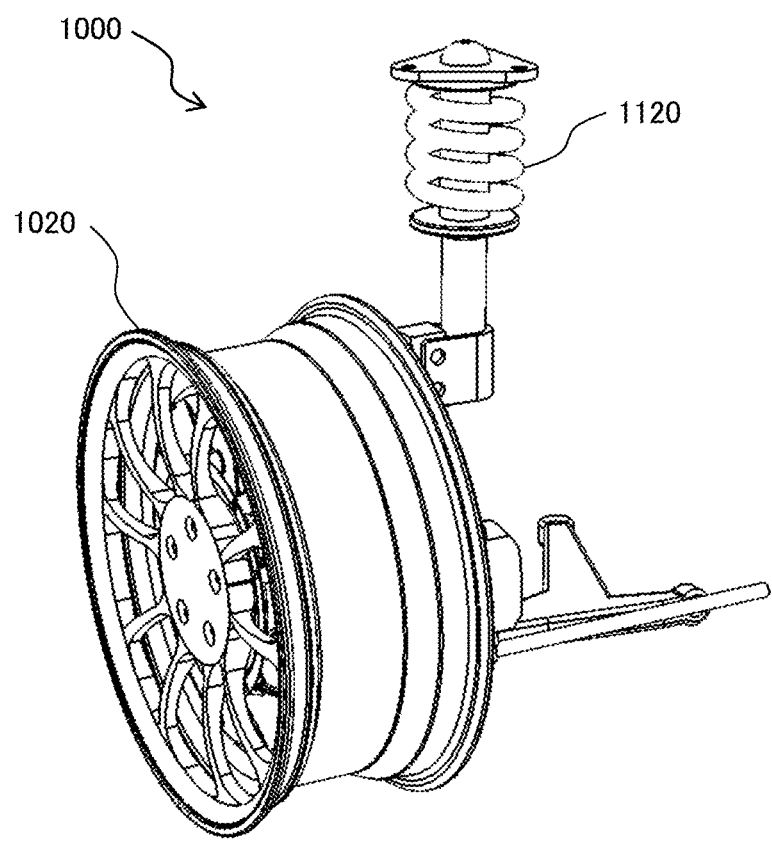
FIG. 12, which is a diagram according to the present invention, is a perspective view showing an appearance of an electrified wheel 1000 of an outer rotor type.

An embodiment of an electrified wheel 1000 will then be described with reference to FIGS. 12 and 13. FIG. 12, which is a diagram according to the present invention, is a perspective view showing an appearance of the electrified wheel 1000 of an outer rotor type. FIG. 13 is an exploded view showing the electrified wheel 1000 of FIG. 12 disassembled along a rotation axis.

An xEV drive motor is required to output high torque and therefore coils (motor coils) making up the motor need to be supplied with a large current. The coil 201 of this embodiment is composed of the flat rectangular wire whose section has the long sides and short sides. This improves the space factor of the coil 201 in the slots, thus suppressing conductor resistance to reduce copper loss.

The electrified wheel 1000 includes a wheel 1020, a rotor assembly 1070, a stator assembly 1080, a power converter 770, and a first case unit 401. The rotor assembly 1070 includes a rotor, a rotor case 400, and a second case unit 402. The stator assembly 1080 includes the stator 10 and a stator case 500. A disc brake 1110 that generates a braking force for braking a wheel is fitted to the electrified wheel 1000. The electrified wheel 1000 is fitted to a frame (vehicle body frame) making up a vehicle body, via a suspension device 1120. Because a dynamo-electric machine 800 used for the electrified wheel 1000 of this embodiment is small and light, a so-called unsprung weight is reduced and drive performance/steering performance are improved.

In this embodiment, the electrified wheel 1000 of an outer rotor type has been described. However, the stator 10 according to the present invention may be applied to an electrified wheel of an inner rotor type.

It should be noted that the present invention is not limited to the above embodiment but includes various modifications. For example, the above embodiment has been described in detail for easy understanding of the present invention, and is not necessarily limited to an embodiment including all constituent elements described above. In addition, some of constituent elements of the embodiment can be deleted therefrom or have other constituent elements added thereto.

REFERENCE SIGNS LIST 10 stator
100 stator core
101 first teeth (first tooth)
102 second teeth (second tooth)
201, 201A, 201B, 201C, 201D coil
202, 202A, 202B, 202C jumper wire
202b bent part
204 junction
770 power converter
800 dynamo-electric machine
1000 electrified wheel
1020 wheel
1120 suspension device
W102A circumferential width on the inner periphery side of the second tooth 102
W102B circumferential width on the outer periphery side of the second tooth 102

The invention claimed is:

1. A stator for a dynamo-electric machine including a stator core, a plurality of coils, and a plurality of jumper wires that electrically connect adjacent coils among the plurality of coils to each other, wherein
the stator core includes a plurality of first teeth each of which is formed in such a way as to have an inner periphery side and an outer periphery side of a constant width and is wound with a coil; and
a plurality of second teeth each of which is not wound with the coil,
the first teeth and the second teeth are arranged alternately in a circumferential direction,
the jumper wires each have a bent part and extend in the circumferential direction and a radial direction so as to absorb a change in an interval between one coil and another coil of two coils wound around the first teeth and adjacent to each other, and are disposed at positions that overlap the second teeth in a view in an axis direction of the dynamo-electric machine, and
each of the jumper wires at least has a part thereof located closer to the stator core than ends in the axis direction of coils wound around the first teeth.

2. The stator for the dynamo-electric machine according to claim 1, wherein an end of the one coil that is closer to the other coil is located on an outer periphery side part of a first tooth wound with the one coil, an end of the other coil that is closer to the one coil is located on an inner periphery side part of the first tooth wound with the other coil, and the jumper wire connects the end of the one coil to the end of the other coil.

3. The stator for the dynamo-electric machine according to claim 1, wherein an end of the one coil that is closer to the other coil and an end of the other coil that is closer to the one coil are located on either respective outer periphery side parts or inner periphery side parts of first teeth wound respectively with the one coil and the other coil, and both ends of the jumper wire are located on either respective outer periphery side parts or inner periphery side parts of the first teeth wound respectively with the one coil and the other coil, to connect the end of the one coil to the end of the other coil.

4. The stator for the dynamo-electric machine according to claim 1, wherein a circumferential width on an inner periphery side of the second tooth is smaller than a circumferential width on an outer periphery side of the second tooth.

5. The stator for the dynamo-electric machine according to claim 1, wherein each of a section of the coil and that of the jumper wire is a rectangle having long sides and short sides.

6. The stator for the dynamo-electric machine according to claim 5, wherein the coil is wound such that long sides of a section of the coil are along a circumferential direction in a view in an axis direction of the dynamo-electric machine, and the bent part is bent along a long side direction of the jumper wire.

7. The stator for the dynamo-electric machine according to claim 1, wherein the one coil, the other coil, and the jumper wire are formed out of a single conductor.

8. The stator for the dynamo-electric machine according to claim 1, wherein the jumper wire has at least one junction.

9. The stator for the dynamo-electric machine according to claim 1, wherein a total number of teeth including the first teeth and the second teeth is 12 or more and is a multiple of 6.

10. A dynamo-electric machine comprising:

the stator for the dynamo-electric machine according to claim 1; and a rotor set counter to the stator with a given gap interposed therebetween.

11. An electric drive system comprising:

the dynamo-electric machine according to claim 10; and a power converter that drives the dynamo-electric machine.

12. An electrified wheel comprising:

a wheel;

a power converter; and a dynamo-electric machine including a stator and a rotor, wherein the stator is disposed closer to the wheel or to a suspension device with which the electrified wheel is fitted to a vehicle body frame, and the stator is provided as the stator for the dynamo-electric machine according to claim 1.

\* \* \* \* \*